United States Patent [19]

Doncheck et al.

[11] Patent Number: 5,405,624
[45] Date of Patent: Apr. 11, 1995

[54] PROCESS FOR PRODUCING A PRODUCT WITH AN INTENSIFIED BEER FLAVOR

[75] Inventors: James A. Doncheck; Bruce J. Morton; Michael R. Sfat; Ann C. Wege, all of Manitowoc, Wis.

[73] Assignee: Bio-Technical Resources, Manitowoc, Wis.

[21] Appl. No.: 148,123

[22] Filed: Nov. 5, 1993

Related U.S. Application Data

[63] Continuation-in-part of Ser. No. 832,132, Feb. 6, 1992, abandoned, which is a continuation-in-part of Ser. No. 770,750, Oct. 3, 1991, abandoned, which is a continuation-in-part of Ser. No. 655,577, Feb. 14, 1991, abandoned.

[51] Int. Cl.⁶ ............................................. C12C 11/00
[52] U.S. Cl. ........................................ 426/11; 426/16; 426/28; 426/29
[58] Field of Search ................... 426/11, 12, 13, 16, 426/28, 29, 30, 520, 590, 592, 600

[56] References Cited

U.S. PATENT DOCUMENTS

| | | | |
|---|---|---|---|
| 3,116,221 | 12/1963 | Sfat et al. | 426/28 |
| 3,361,570 | 2/2968 | Malick | 99/31 |
| 3,373,040 | 3/1968 | Gluek | 99/31 |
| 3,689,277 | 9/1972 | Sfat et al. | 99/28 |
| 3,711,292 | 1/1973 | Sfat et al. | 99/31 |
| 3,717,471 | 2/1973 | Sfat et al. | 99/31 |
| 3,908,021 | 9/1975 | Rehberger et al. | 426/11 |
| 4,788,066 | 11/1988 | Witt | 426/16 |

OTHER PUBLICATIONS

Sfat, M. R., and Doncheck, J. A., "Brewers Digest" vol. 65, No. 2, pp. 20–22 (1990).
"New Brewing Technology Creates Beer Flavor" reprint from Food Engineering Jul. 1989.
Morton, B. J. and Sfat M. R., "Development In Industrial Microbiology" vol. 20, pp. 217–224 (1979).
M. R. Sfat and J. A. Doncheck, *Malts and Malting*, in *Kirk–Othmer: Encyclopedia of Chemical Technology*, 3rd Ed., vol. 14, Wiley, New York, 1981, pp. 810–823.

*Primary Examiner*—Donald E. Czaja
*Assistant Examiner*—Leslie Wong

[57] ABSTRACT

A process for producing a product with an intensified beer flavor is disclosed. The process comprises: steeping barley with water to produce steeped-out barley; treating the steeped-out barley with an enzyme promoter; preferably gibberellic acid; germinating the steeped-out barley to produce a green malt; heating the green malt to 70–89 C. for 0.5 to 3 hours while maintaining the moisture content of the green malt at 30–55 weight percent; drying the heated green malt to produce dried malt, the dried malt having a moisture content of 3.5–5.5 weight percent; making a mash from the dried malt by grinding and adding brewing water, thus producing a wort and a residue; separating the wort from the residue; boiling the wort to produce boiled wort; cooling and pitching the boiled wort with yeast to produce pitched wort; and fermenting the pitched wort to produce the product with an intensified beer flavor.

17 Claims, No Drawings

PROCESS FOR PRODUCING A PRODUCT WITH AN INTENSIFIED BEER FLAVOR

CROSS-REFERENCE TO RELATED APPLICATIONS

This application is a continuation-in-part of application Ser. No. 07/832,132 filed Feb. 6, 1992, now abandoned, which is a continuation-in-part of application Ser. No. 07/770,750, filed Oct. 3, 1991, now abandoned, which is a continuation-in-part of application Ser. No. 07/655,577, filed Feb. 14, 1991, now abandoned.

FIELD OF THE INVENTION

This invention relates to brewing. In particular this invention relates to a process for the preparation of a product with an intensified beer flavor.

BACKGROUND OF THE INVENTION

Health, life style, and safety concerns have produced an increasing demand for low alcoholic, non-alcoholic (less than 0.5% alcohol by volume), alcohol free (no alcohol), and low calorie (40 or fewer calories per 12 fluid ounces) malt beverages. However, the current processes for producing such beverages have numerous problems. Some processes can not be carried out in existing equipment and require large expenditures for new plant and equipment. Other processes are energy intensive. None of the processes produce a fermented malt beverage that has the physical and organoleptic attributes that are familiar to and desired by the consumer. These processes are discussed in R. Siebel, Brewers Digest, 13 (March, 1990).

Although malts produced for brewing beer are carefully made to contain the enzymes, extract and nitrogen necessary to perform well in the brewhouse, ferment well, and produce a fermented malt beverage that has the attributes desired by the consumer, such malts are not suited for producing a low or non-alcoholic malt beverage. Other specialty malts with more intense flavor are commercially available, but these are usually produced by using higher kiln finishing temperatures which result in a predominant caramel aroma and flavor in the finished product. Dextrine or crystal malt, for example, is made by heating high moisture green malt to a temperature range that favors amylolytic activity (60°–75° C.), holding such temperature for a time to liquefy and saccharify starch, then increasing the temperature to about 150° C. to caramelize the resulting sugars. A need exists for a process for producing a fermented malt beverage: that (1) can be carried out in existing equipment; (2) requires little or no more energy than ordinary brewing; and (3) produces a product with physical and organoleptic attributes that are familiar to and desired by the consumer.

Sfat, U.S. Pat. No. 3,689,277, discloses a process for producing a malt flavor base for use in foodstuffs, particularly lower calorie beer. The process involves grinding a high protein content grain seed, such as high protein barley, followed by an aqueous enzymatic treatment to extract the protein preferentially from the grain as compared with carbohydrates. The starch content of the extract is hydrolyzed by treatment with amylolytic enzyme to provide starch-free solution which is mixed with sugar and dried by heating to impart a caramel flavor. Sfat, U.S. Pat. No. 3,711,292, discloses producing a concentrated protein hydrolysate substantially free of starch by heating a starchy proteinaceous cereal grain with an aqueous proteolytic enzyme to produce a solution containing soluble protein hydrolysis products together with a starchy carbohydrate fraction, separating the solution from undissolved residue, and treating the separated solution with amylolytic enzyme to produce a starch-free solution. The product is useful as a flavor precursor for beer or may be incorporated in a sugary fermentation wort to produce a beer low in unfermentable carbohydrates. Sfat, U.S. Pat. No. 3,717,471, discloses a low carbohydrate beer produced by subjecting barley malt to aqueous extraction conditions favorable to extraction of protein while unfavorable to the extraction of carbohydrate, adding a highly fermentable sugar to the resulting extract to produce a brewers wort low in unfermentable carbohydrates, and fermenting the resulting wort. Although these processes have certain advantages, they do not produce non-alcoholic, or alcohol free, low calorie malt beverages.

SUMMARY OF THE INVENTION

The invention is a process for preparing a dried malt with a high content of beer flavor precursors, beer flavor components, coloring agents, and soluble protein and low amylase levels, the process comprising, in order:

(A) steeping barley with water to produce steeped-out barley;

(B) treating the steeped-out barley with an enzyme promoter;

(C) germinating the steeped-out barley to produce a green malt;

(D) heating the green malt to 70°–89° C. for 0.5 to 3 hours while maintaining the moisture content of the green malt at 30–55 weight percent; and (E) drying the heated green malt to produce dried malt, the dried malt having a moisture content of 3.5–5.5 weight percent.

The dried malt can be converted to a product with an intensified beer flavor by a modification of standard brewing and fermentation techniques. Because this product possesses an intensified beer flavor, it can be diluted 10:1 or more to produce a non-alcoholic, or alcohol free, low calorie malt beverage that still possesses good beer flavor characteristics. The product with an intensified beer flavor can also be vacuum-evaporated; freeze-concentrated; freeze-dried; spray-dried; or blended, formulated, or used as a flavor additive for various types of malt beverages.

DETAILED DESCRIPTION OF THE INVENTION

This invention is a process (1) for preparing a dried malt with a high content of beer flavor precursors, beer flavor components, coloring agents, and soluble protein and low amylase levels and (2) for converting the malt to a product with an intensified beer flavor.

Barley malt is steeped with water to produce steeped out barley which is germinated at a fairly low temperature. Germination is carried out with daily mixing and water addition as needed to maintain the moisture content at about 43%. The resulting green malt contains a high content of beer flavor precursors, beer flavor components, and coloring agents. After germination is complete, the green malt is heated at a high moisture content to generate beer flavor precursors, beer flavor components and also to reduce amylolytic enzyme activity. After heating, the malt is transferred to a kiln basket through which hot air is passed for a few hours to partially dry the malt. Then the heat is somewhat reduced to allow the malt to further dry for nearly a day. Then the inlet hot air temperature is increased to 85°–95° C. for a few hours for a final drying and further enhancing the flavor and color of the malt. The resulting dried malt has a moisture content of 3.5–5.5% and a soluble protein content of 6.5–8%.

The dried malt is then mashed, either by itself or with conventional malt, to produce a wort which is boiled with hops, cooled, pitched with brewers yeast, and fermented. During fermentation, a toasted barley protein extract may be added to further intensify the flavor of the finished product. The fermented wort is chilled to settle the yeast then filtered to produce a product with an intensified beer flavor.

Dried Malt Preparation

The process involves making a malt with high soluble protein, low amylase content, and very high levels of beer flavor precursors, beer flavor components and coloring agents. Low amylase content limits the amount of fermentable sugar produced during mashing. The malt must possess enough soluble protein to provide nitrogen for fermentation. Such a malt is made by modifying the kilning process.

In the standard or conventional malting process, brewers malt is kilned in a series of stepwise temperature increases during the course of drying. Beginning inlet air temperatures are of the order of 140° F. (60° C.) for several hours and finishing is a few hours at about 175° F. (79° C.) some 24 hours later. High heat levels are avoided during the high moisture stage of drying as a means of minimizing heat destruction of enzymes. As the product dries, the enzymes become less susceptible to destruction by heat.

Dried malt having a significantly increased content of flavor precursors and/or flavorings along with being lower in content of amylase enzymes is made by applying high heat to the moist malt during initial heating to reduce amylase enzymes. This initial heating can be done by sealing the malt in a closed container or by using an open container contained within a system adapted to maintain the malt in a very damp condition, such as recycling high moisture content air.

After the malt temperature has been at 70°–89° C. for one-half to three hours and the container is opened, the malt is still very damp, generally containing about 30 to 55 weight percent moisture, based on the total malt plus moisture, preferably 35 to 50 weight percent, and usually about 45 weight percent moisture. Generally the malt is heated to 70°–89° C. for one-half to three hours by applying heated air to the malt at 85°–95° C. for two to six hours. The malt is then put in an open-topped container having a foraminous bottom or other means to allow for the passage of heated air through the bed of grain. The bed of grain is blown with air that has an inlet temperature of about 85° C. and an exit temperature of about 70°–85° C. The inlet air temperature is turned down to 55°–65° C. for 12–20 hours, after which the inlet air temperature is raised to 85°–95° C. for one-half to three hours. The outlet air temperature is approximately the same as the inlet air temperature during this period. During this period, the malt temperature rises from a range of 45°–55° C. to a range of 85°–90° C. The moisture content of the dried malt is 3.5 to 5.5% and the soluble protein is 6.5 to 8%.

Brewing

The high soluble protein, low amylase malt can be processed by conventional brewing processes and in conventional brewing equipment to produce the product with an intensified beer flavor. Additional information on brewing can be found in *The Practical Brewer*, 2nd. Ed., H. M. Broderick, Ed., Master Brewers Association of America, Madison, Wis., 1977.

If desired, the low amylase malt may be blended with another malt or malts before brewing. Malts that may be added include standard brewer's malt, high color, low amylase malt, etc. Depending on the alcohol content desired in the final product, mixtures containing up to 40 weight percent added malt may be used to advantage. If the final malt mixture contains more than about 10 percent by weight of the added malt, a conventional high color, low amylase malt should be used as the added malt to produce the proper color in the final product.

The malt is ground to provide a 70–80% retention on a No. 14 U.S. sieve series screen. The ground malt is mixed with 2.5 to 4 times its weight of brewing water and mashed in at 35°–40° C. for 5 to 15 minutes and then given a protein rest for 45–90 minutes without stirring. Stirring is then resumed and the mash is heated to 70°–73° C. and held for 15–30 minutes. The temperature is then raised to 75° C. and the mash transferred to the lauter unit. The lauter temperature is about 72°–77° C. for both the bath and sparge water. The amount of sparge water used is about 50–75% of the amount of brewing water. The mash is then allowed to settle for 10–20 minutes and run-off begun. The wort is recycled until reasonably clear, then it is directed to the brew kettle. The collected wort is then boiled for one to two hours. To the wort is added from 0–8%, based on dry malt, hops mostly during early stages of the boil.

The wort is then cooled and aerated. The wort is then pitched with 0.7–1.5 lb/bbl brewers yeast. The wort is then fermented at 12°–16° C. for five to ten days. After fermentation, the fermented wort is moved to a cold room at 0°–5° C. Typically, the yeast is allowed to settle, and the fermented wort filtered one or more times. Other conventional processing steps well known to those skilled in the art may be used.

If a product with a more intense beer flavor, suitable, for example, as a food flavoring, is desired, a protein extract (0.05–1.0 percent by weight based on the total amount of wort) may be added to the fermentation. The protein extract is added about two to four days, typically three days, after the beginning of the fermentation.

After filtration, the fermented wort can be vacuum evaporated, freeze concentrated, freeze-dried, spray-dried, or can be blended or formulated into various types of beer or intense beer flavored products. The fermented wort can be diluted with water to produce a low calorie (40 or fewer calories per 12 ounces), non-alcoholic malt beverage (less than 0.5 volume percent alcohol) that closely simulates conventional beer flavor, taste and mouthfeel. A low calorie malt beverage containing 25–35 calories can be made by this process.

INDUSTRIAL APPLICABILITY

The invention produces dried malt with a high content of beer flavor precursors, beer flavor components, coloring agents, and soluble protein and low amylase levels. The dried malt can be converted to a product with an intensified beer flavor. This product can be blended or formulated into a variety of conventional beers, lower calorie beers, low calorie beers, low alcohol beers, non-alcoholic beer-flavored malt beverages, and other beer flavored products. The process is not energy intensive. Since it can be carried out in conventional brewing equipment, it does not require substantial investments in new plant and equipment.

The intensified beer flavor product can also be further concentrated to a high solids intense beer flavored liquid or dried to an intense beer flavored powder that can be added to a variety of materials to produce an economical beer flavored product. The product with an intensified beer flavor, or its concentrate, can be added to cheddar cheese to impart an enhanced aged cheddar flavor; to yeast rolls to impart a fresh bread flavor and improve texture; to beer batter to impart a bread-like, grainy, toasted slightly hop bitter flavor and to smoked sausage to impart a zesty, spicier flavor.

The advantageous properties of the invention can be observed by reference to the following examples that illustrate, but do not, limit the invention.

EXAMPLE 1

This example illustrates preparation of a dried malt with a high content of beer flavor precursors, beer flavor components, coloring agents, and soluble protein and low amylase levels.

Five and one-half kilograms of barley (12% moisture, 12.5% protein) was steeped in water for 18 hr at room temperature. The water was changed two times during steep. The steep-out moisture was 40 wt. %.

The steeped-out barley was then placed in a container which has a perforated steel bottom and humidified air blown through the bed to maintain the temperature at 12° C. After 24 hr, the barley was treated with gibberellic acid (10 ppm barley basis in 300 mL of water) by mixing with the barley. The germinating barley was mixed and watered daily to maintain a moisture content of approximately 43 wt. %.

After germination was complete (six days), the green malt was covered with foil and placed in an oven at a temperature of 88° C. for six hr. At the end of this cycle, the malt moisture was about 45%.

|              | Exit Air Temp (C.) | Bed Temp (C.) |
|--------------|--------------------|---------------|
| After 2 hr   | 87                 | 70            |
| After 4 hr   | 89                 | 82            |
| After 6 hr   | 89                 | 83            |

The malt was then transferred to a kiln basket, having a screen bottom and open top, and put in a kiln with the air temperature set at 88° C. for two hr to achieve partial drying.

|              | Exit Air Temp (C.) | Bed Temp (C.) |
|--------------|--------------------|---------------|
| After 5 min  | 80                 | 62            |
| After 30 min | 75                 | 56            |
| After 60 min | 71                 | 54            |
| After 90 min | 69                 | 51            |
| After 120 min| 70                 | 52            |

The kiln temperature was turned down to 60° C. and held for 15 hr to achieve further drying. Then the kiln temperature was turned up to 88° C. and held for 3 hr.

|              | Exit Air Temp (C.) | Bed Temp (C.) |
|--------------|--------------------|---------------|
| After 5 min  | —                  | 49            |
| After 30 min | 85                 | 84            |
| After 60 min | 87                 | 87            |
| After 90 min | 87                 | 88            |
| After 120 min| 87                 | 89            |

The final moisture content was 4.5%. Soluble protein was 7.5%. The total kilning time was 26 hr. This malt was labeled Type 1.

EXAMPLE 2

This example illustrates the preparation of a conventional high-color, low amylase dried malt.

Barley (5.5 kg) (12% moisture, 12.5% protein) was steeped in water for 18 hr at room temperature. The water was changed two times during steep. The steep-out moisture was 40 wt %.

The steeped-out barley was then placed in a container which has a perforated steel bottom and humidified air blown through the bed to maintain the temperature at 12° C. After 24 hr, the barley was treated with gibberellic acid (10 ppm barley basis in 300 mL water) by mixing with the barley. The germinating barley was mixed and watered daily to maintain a moisture content of approximately 43 wt %.

After germination was complete (six days), the green malt was placed in a kiln at 60° C. and held for 16 hr. The kiln temperature was increased to 80° C. and held for 4 hr. The kiln temperature was increased to 86° C. and held for 4 hr to complete the kilning cycle. This malt was labeled Type 2. Malt analyses are given Table 1.

TABLE 1
Analysis of Type 1 and Type 2 Malt
(American Society of Brewing Chemists Methods of Analysis)

|                                       | Type 1[a] | Type 2[b] |
|---------------------------------------|-----------|-----------|
| Moisture, %                           | 5.4       | 2.6       |
| Fine Grind Extract, % dry basis       | 77*       | 77.8      |
| Coarse Grind Extract, % dry basis     | 70*       | 74.8      |
| Fine Coarse Difference, %             | 7*        | 3.0       |
| Diastatic Power, °L, dry basis        | 10        | 25        |
| Alpha Amylase, 20° Units, dry basis   | 10        | 16.2      |
| Soluble Protein, % dry basis          | 7.5       | 6.4       |
| Total Protein, % dry basis            | 12.5      | 12.5      |
| Soluble/Total Protein Ratio, % dry basis | 60     | 60        |
| Color, °Lov.                          | 60        | 60        |

[a]Dried malt with a high content of beer flavor precursors, beer flavor components, coloring agents, and soluble protein and low amylase levels.
[b]Conventional high-color, low amylase malt.
*Estimated.

EXAMPLE 3

This example illustrates the preparation of a toasted barley protein extract.

To 20 L of tap water at 42° C. was added 8 g papain (crude concentrate, Fluka Chemical Co.), 4 g potassium meta bisulfite, 4 Kg finely-ground barley having a protein content of 14%. The temperature was maintained at 42° C. for 4 hr with stirring and then cooled. The liquid was separated by centrifugation. The liquid contains 2.5–3.0% solids and 50% (dry basis) protein. The solids content could be increased to 7–10% by initially grinding to flour consistency, increasing the initial solids content, and/or employing a countercurrent extraction process. If chilling to 0° C. overnight and decanting was substituted for centrifugation, about 50% of the liquid was recovered instead of the 67% recovered by centrifugation.

The liquid was spray-dried using a Niro spray drier with an inlet temperature of 205° C. and a 95° C. outlet temperature. Approximately 233 g of spray-dried protein extract was recovered with an additional 40–50 g remaining on the walls. The spray-dried extract was spread on a tray (layer about ¾", 1.9 cm) and placed in a circulating air oven at 88° C. to toast. The final product was a dark tan hygroscopic powder having a moisture content of about 3.5% and a protein content of 50% (dry basis).

EXAMPLES 4–7

Malt (1.200 Kg total) in the proportions reported in Table 2 was ground to a standard brewers grind using a Miag Mill to provide a product exhibiting a 75 wt. % retention on a No. 14 U.S. screen. The ground malt was added to 3.6 L of brewing water and mashed in at 38° C. for 10 min with stirring. Stirring was stopped and the mash given a 1 hr protein rest at 38° C. Stirring was resumed and the mash was heated to a conversion temperature of 73° C. and held for 20 min. The temperature was raised to 75° C. and the mash was poured over into a lauter tub maintained at 75° C. Sparging was also at 75° C. using 2.0 L of brewing water as the sparge. The mash was allowed to settle for 15 min and then run off was begun. The wort was recycled until reasonably clear, then was run to the kettle. The collected wort was boiled for 1.5 hr. The hop charge was 25 g of Cascade pellets (ca 5.8% alpha acid) added 5 min into the boil and an additional 17 g Cascade pellets plus 33 g Hallertau Huellerbitter added 1 hr into the boil. The wort was then cooled and aerated. The wort was pitched with 1 lb/bbl yeast (ATCC 32634-1) and fermented for 7 days at 14° C. After 72 hr of fermentation, 25 g of the protein extract prepared in Example 3 above was added. The fermented wort was moved to a 3° C. cold room to settle the yeast before filtration. After filtration, the beer can be freeze-dried, spray-dried or can be blended or formulated into various types of beer or dry beer flavored products.

TABLE 2

| Example No. | 4 | 5 | 6 | 7 |
|---|---|---|---|---|
| Grain Bill: | | | | |
| Total g (as is) | 1200 | 1200 | 1200 | 1200 |
| % Type 1 Malt (as is) | 90 | 90 | 50 | 50 |
| % Type 2 Malt (as is) | 10 | 10 | 50 | 50 |
| Type 1 Malt g (dry basis) | 1021.7 | 1021.7 | 567.6 | 567.6 |
| Type 2 Malt g (dry basis) | 116.9 | 116.9 | 584.4 | 584.4 |
| Total g (dry basis) | 1138.6 | 1138.6 | 1152.0 | 1152.0 |
| Water for Mashing, g | 3600 | 3600 | 3600 | 3600 |
| Wort Before Boil: | | | | |
| Total, g | 5456 | 5756 | 4830 | 4672 |
| Extract, % | 11.04 | 10.06 | 13.73 | 13.66 |
| Extract, g | 602.3 | 579.1 | 663.2 | 638.2 |
| Yield, % | 52.9 | 50.9 | 57.6 | 55.4 |
| Yield Efficiency, % | 68.6 | 66.0 | 74.4 | 71.6 |
| Wort After Boil: | | | | |
| Total, g | 3466* | 4142* | 3350* | 3522* |
| Extract, % | 17.10 | 14.61 | 18.57 | 18.97 |
| Protein, % | 1.50 | 1.49 | 1.80 | 1.79 |
| Fermented Wort: | | | | |
| Specific Gravity | 1.045051 | 1.03550 | 1.04067 | 1.04135 |
| Alcohol, % by wt. | 2.68 | 2.24 | 3.32 | 3.21 |
| Real Extract, % | 11.00 | 9.76 | 11.44 | 11.61 |
| Real Degree of Ferm., % | 35.7 | 33.2 | 38.4 | 38.8 |
| Protein, % by wt. | 1.57 | 1.35 | 1.50 | 1.42 |
| Color, SRM | 69.6 | 58.0 | 67.6 | 64.4 |
| pH | 4.76 | 4.78 | 4.67 | 4.77 |

*Unhopped Brew
**Hopped Brew

EXAMPLE 8

Type 1 malt prepared on a large (about 6440 bushels) scale was brewed according to the schedule of Examples 4–7 with the exception that barley protein extract was not added to the fermenting wort. Analytical properties of the malt are shown in Table 3.

TABLE 3

Properties of Type 1 Malt[a] Prepared on Large Scale
(American Society of Brewing Chemists Methods of Analysis)

| | |
|---|---|
| Moisture, % | 3.8 |
| Fine Grind Extract, % dry basis | 76.5 |
| Coarse Grind Extract, % dry basis | 75.5 |
| Fine Coarse Difference, % | 1.0 |
| Diastatic Power, °L, dry basis | 0.0 |
| Alpha Amylase, 20° Units, dry basis | 0.0 |
| Soluble Protein, % dry basis | 5.98 |
| Total Protein, % dry basis | 12.07 |
| Soluble/Total Protein Ratio, % dry basis | 48.37 |
| Color, °Lov. | 23.9 |

[a]Dried malt with a high content of beer flavor precursors, beer flavor components, coloring agents, and soluble protein and low amylase levels.

This malt was brewed without the inclusion of any other malt in the grain bill and the results are presented in Table 4.

TABLE 4

BREWING DATA
(Type 1 Malt)

| | |
|---|---|
| Grain Bill: | |
| Total g (as is) | 1200 |
| % Type 1 malt (as is) | 100 |
| Type 1 Malt g (dry basis) | 1154.4 |
| Total g (dry basis) | 1154.4 |
| Water for Mashing, g | 3600 |
| Wort Before Boil: | |
| Total, g | 4696 |
| Extract, % | 11.88 |
| Extract, g | 557.9 |
| Yield, % | 48.4 |
| Yield Efficiency, % | 63.2 |
| Wort After Boil: | |
| Total, g | 3700 |
| Extract, % | 18.00 |
| Protein, % | 1.74 |
| Fermented Wort: | |
| Specific Gravity | 1.04547 |
| Alcohol, % by wt. | 2.98 |
| Real Extract, % | 12.63 |
| Real Degree of Ferm., % | 30.64 |
| Protein, % by wt. | 1.53 |
| Color, SRM | 64.1 |
| pH | 4.59 |

EXAMPLE 9

The product produced in Example 8 was diluted with deaerated tap water to bring alcohol concentration down to approximately 0.30% by volume using a dilution ratio of about 1:10 to 1:12. Fructose (0.3%) and 0.015% sodium chloride were added to improve mouthfeel.

Approximately 5.0% commercial beer was added as a blending agent. The beer was carbonated at 28 psi (193 kPa) and 3° C. for 45 min, then bottled. The bottled beer was pasteurized (15 P.U.) prior to chilling to 3° C. The resulting beer has a color (SRM) of 2.4, bitterness units of 10, an alcohol content of about 0.5% by volume, 26 calories per 12 ounces, a protein content of 0.10 wt. % and a typical beer flavor.

Having described the invention, we now claim the following and their equivalents.

We claim:

1. In a process for preparing dried malt with a high content of beer flavor precursors, beer flavor components, coloring agents, and soluble protein and low amylase levels comprising, in order:
    (A) steeping barley with water to produce steeped-out barley;
    (B) germinating the steeped-out barley to produce a green malt; and
    (C) drying the green malt to produce dried malt, the dried malt having a moisture content of 3.5–5.5 weight percent; the improvement comprising, following step (B) and preceding step (C):
    heating the green malt to 70°–89° C. for 0.5 to 3 hours while maintaining the moisture content of the green malt at 30–55 weight percent.

2. The process of claim 1 additionally comprising, following step (A) and preceding step (B):
    treating the steeped-out barley with an enzyme promoter.

3. The process of claim 2 wherein the enzyme promoter is gibberellic acid.

4. The process of claim 1 wherein the green malt is dried at 55°–65° C. for 12–20 hours and then at 85°–95° C. for one-half to 3 hours.

5. In a process for preparing a product with an intensified beer flavor comprising, in order:
    (A) steeping barley with water to produce steeped-out barley;
    (B) germinating the steeped-out barley to produce a green malt;
    (C) drying the green malt to produce dried malt, the dried malt having a moisture content of 3.5–5.5 weight percent;
    (D) making a mash from the malt produced in the preceding step by grinding and adding brewing water, thus producing a wort and a residue;
    (E) separating the wort from the residue;
    (F) boiling the wort to produce boiled wort;
    (G) cooling and pitching the boiled wort with yeast to produce pitched wort; and
    (H) fermenting the pitched wort; the improvement comprising:, following step (B) and preceding step (C):
    heating the green malt to 70°–89° C. for 0.5 to 3 hours while maintaining the moisture content of the green malt at 30–55 weight percent.

6. The process of claim 5 additionally comprising, following step (A) and preceding step (B):
    treating the steeped-out barley with an enzyme promoter.

7. The process of claim 6 wherein the enzyme promoter is gibberellic acid.

8. The process of claim 5 wherein the heated malt is dried at 55°–65° C. for 12–20 hours and then at 85°–95° C. for one-half to 3 hours.

9. The process of claim 5 additionally comprising, following step (C) and preceding step (D), the step of mixing a conventional high-color, low-amylase brewers barley malt with the dried malt, the conventional malt forming up to 40 percent by weight of the final mixture of dried malt and conventional malt.

10. The process of claim 5 wherein 0.05–1.0% by weight of toasted barley protein extract, based on the total amount wort, is added to the boiled wort during step (H).

11. The process of claim 10 additionally comprising, following step (H), the product with an intensified beer flavor is vacuum evaporated or freeze concentrated to produce a liquid concentrate.

12. The process of claim 10 additionally comprising, following step (H), freeze-drying or spray drying the product with an intensified beer flavor to produce a solid product.

13. The process of claim 10 wherein the heated green malt is dried at 55°–65° C. for 12–20 hours and then at 85°–95° C. for one-half to 3 hours.

14. The process of claim 5 additionally comprising, following step (H), diluting the product with an intensified beer flavor with water to produce a malt beverage containing less than 0.5 volume percent alcohol and fewer than 40 calories per 12 ounces of beverage.

15. The process of claim 14 wherein the green malt is dried at 55°–65° C. for 12–20 hours and then at 85°–95° C. for one-half to 3 hours.

16. The process of claim 5 additionally comprising, following step (H), the product with an intensified beer flavor is vacuum evaporated or freeze concentrated to produce a liquid concentrate.

17. The process of claim 5 additionally comprising, following step (H), freeze-drying or spray drying the product with an intensified beer flavor to produce a solid product.

* * * * *